US005743092A

United States Patent [19]
Guenther et al.

[11] Patent Number: 5,743,092
[45] Date of Patent: Apr. 28, 1998

[54] MASTER CYLINDER AND BRAKE FLUID RESERVOIR ASSEMBLY HAVING A SNAP-IN RETENTION FEATURE

[75] Inventors: Stefan Guenther, Orion; Kevin Gallagher, Commerce, both of Mich.; M. Brent Jensen, Bountiful, Utah

[73] Assignee: ITT Automotive Inc., Auburn Hills, Mich.

[21] Appl. No.: 714,916

[22] Filed: Sep. 17, 1996

[51] Int. Cl.$^6$ .............................. F15B 7/00; B60T 11/28
[52] U.S. Cl. ........................................ 60/583; 60/585
[58] Field of Search ............................ 60/583, 585, 586, 60/587

[56] References Cited

U.S. PATENT DOCUMENTS

| | | | |
|---|---|---|---|
| 4,474,005 | 10/1984 | Steer | 60/585 X |
| 4,514,983 | 5/1985 | Gaiser | 60/585 X |
| 4,858,437 | 8/1989 | Ochiai | 60/585 X |
| 4,934,144 | 6/1990 | Larin | 60/585 |
| 4,970,863 | 11/1990 | Cunningham | 60/585 |
| 5,101,631 | 4/1992 | Coleman | 60/585 |
| 5,586,436 | 12/1996 | Sakaguchi et al. | 60/585 |

Primary Examiner—Hoang Nguyen
Attorney, Agent, or Firm—J. Gordon Lewis; Thomas N. Twomey

[57] ABSTRACT

A combination of a master cylinder and a fluid reservoir includes a master cylinder, a reservoir, and a pair of elastomeric seals between the master cylinder and the reservoir. The master cylinder has a first bore which defines a first reservoir seat and a second bore which defines a second reservoir seat. The first bore and the second bore are spaced a predetermined distance from each other. The master cylinder also has a rigid snap-in attachment seat disposed between the first bore and the second bore. The reservoir has a first cylindrical seating projection and a second cylindrical seating projection spaced the predetermined distance from the first seating projection. A snap-in attachment member is disposed between the first and second seating projections for alignment with and engagement with the snap-in attachment seat. The seals are disposed between each of the first bore and the first seating projection and the second bore and the second seating projection. When the snap-in attachment member is engaged with the attachment seat, the seals are both compressed between the reservoir and the master cylinder preventing any fluid leakage therepast.

3 Claims, 2 Drawing Sheets

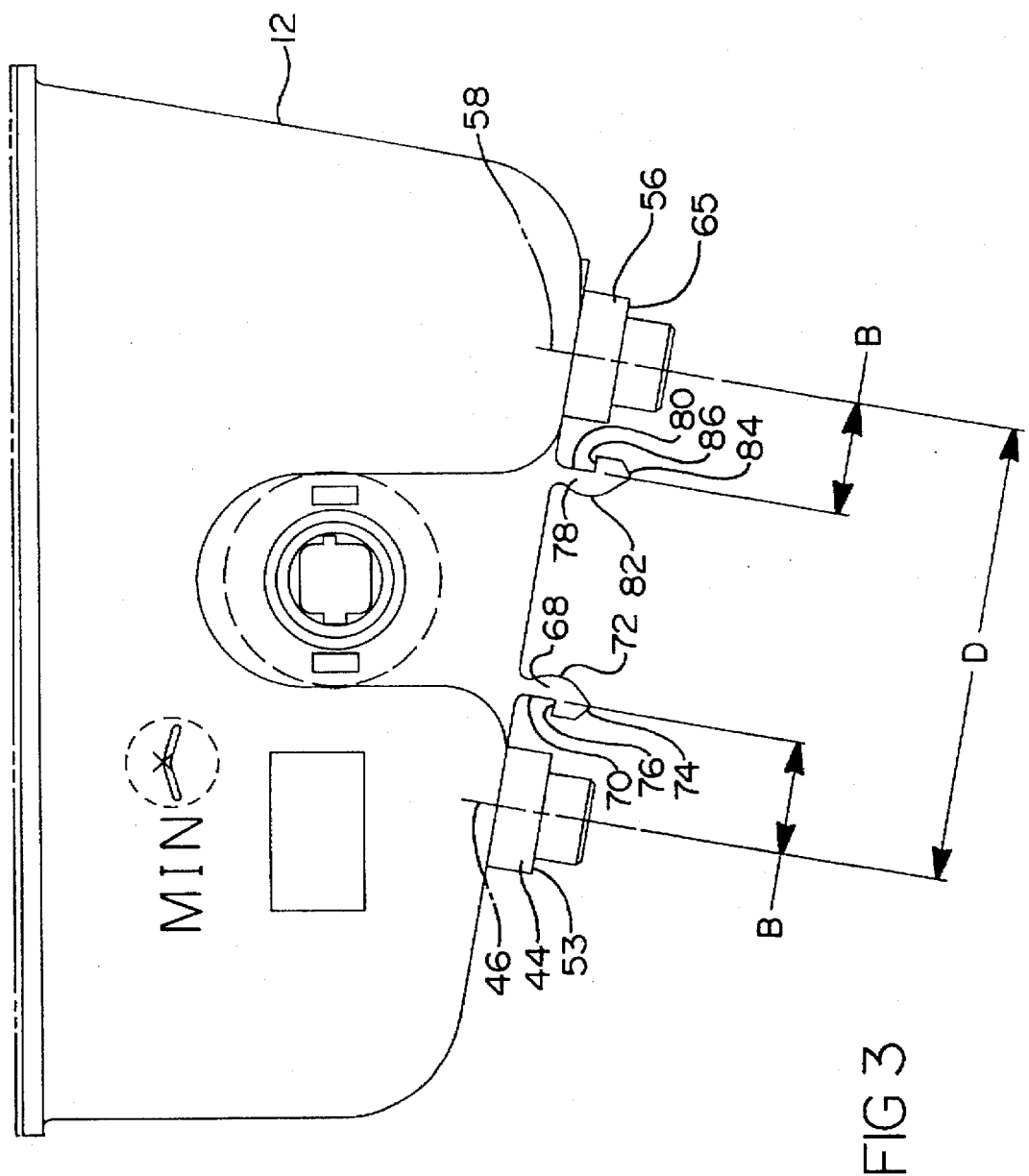

5,743,092

MASTER CYLINDER AND BRAKE FLUID RESERVOIR ASSEMBLY HAVING A SNAP-IN RETENTION FEATURE

FIELD OF THE INVENTION

The present invention relates to attachments between brake fluid reservoirs and master cylinders. It is particularly directed to a push-in or snap-in type retention feature.

BACKGROUND OF THE INVENTION

Known attachments between brake system tandem master cylinders, or master cylinders, and brake fluid reservoirs typically include a separate distinct fastener such as a pin, clamp or threaded fastener which keeps the master cylinder and brake fluid reservoir in engagement. This type of attachment requires a multiple step assembly operation to join the master cylinder and the brake fluid reservoir. The reservoir sealingly connects with two pressurizing chambers in the master cylinder. It is desired to provide a master cylinder and brake fluid reservoir combination which can be more easily assembled, and yet provide a high reliability seal between the master cylinder and the reservoir.

SUMMARY OF THE INVENTION

A combination of a master cylinder and a fluid reservoir includes a master cylinder, a reservoir, and a pair of elastomeric seals between the master cylinder and the reservoir. The master cylinder has a first bore which defines a first reservoir seat and a second bore which defines a second reservoir seat. The first bore and the second bore are spaced a predetermined distance from each other. The master cylinder also has a rigid snap-in attachment seat disposed between the first bore and the second bore. The reservoir has a first cylindrical seating projection and a second cylindrical seating projection spaced the predetermined distance from the first seating projection. A snap-in attachment member is disposed between the first and second seating projections for alignment with and engagement with the snap-in attachment seat. The seals are disposed between each of the first bore and the first seating projection and the second bore and the second seating projection. When the snap-in attachment member is engaged with the attachment seat, the seals are both compressed between the reservoir and the master cylinder, thereby preventing any fluid leakage therepast.

A method of assembling a reservoir to a master cylinder includes the steps of forming a master cylinder, forming a reservoir, forming a pair of seals for disposition between the reservoir and the master cylinder, locating the seals between the master cylinder and the reservoir, and pushing the reservoir into engagement with the master cylinder. The method of assembling the reservoir also includes the steps of forming the master cylinder to have a first reservoir bore defining a first reservoir seat, a second bore defining a second reservoir seat spaced a predetermined distance from the first bore, and a rigid snap-in attachment seat disposed between the first bore and the second bore. The reservoir is formed to have a first cylindrical seating projection, a second cylindrical seating projection spaced the predetermined distance from the first seating projection, and a snap-in attachment member disposed between the first and the second seating projections for alignment and engagement with the snap-in attachment seat. Prior to the reservoir and the master cylinder being pressed together, the first and second cylindrical seating projections are aligned with the first and second bores respectively.

The snap-in attachment provides a positive connection between the master cylinder and the reservoir which ensures an appropriate preloading of the elastomeric seals disposed therebetween to prevent any fluid leakage at the interface between the master cylinder and the reservoir. The snap-in attachment enables assembly of the reservoir to the master cylinder without any special tools, and without any additional parts beyond the seals.

BRIEF DESCRIPTION OF THE DRAWINGS

FIG. 3 is side view of the reservoir.

DESCRIPTION OF THE PREFERRED EMBODIMENTS

Figure 1:
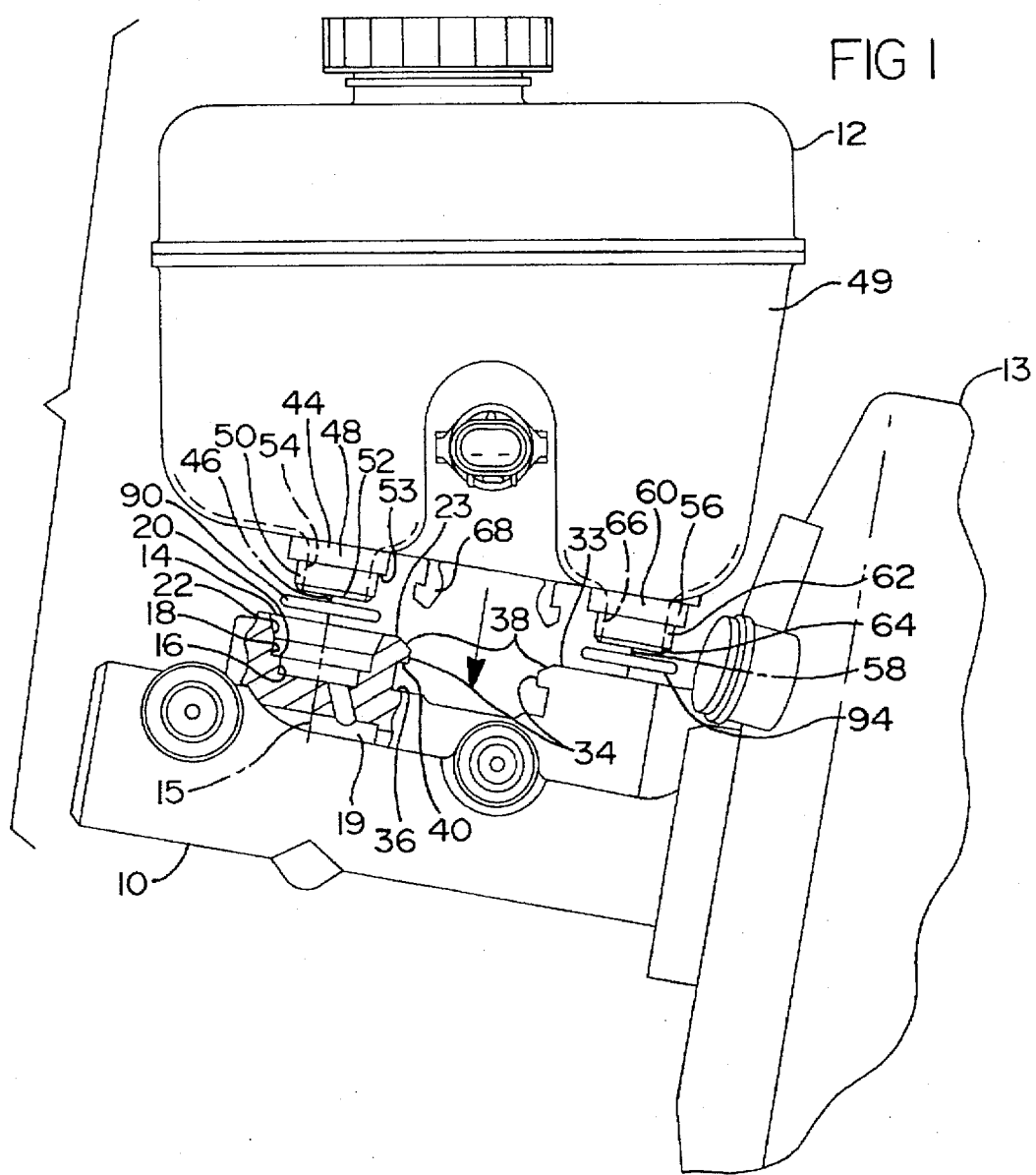
FIG. 1 is a side view of the reservoir and master cylinder aligned for assembly.

FIG. 1 shows a tandem master cylinder 10, or master cylinder 10 formed of cast iron or aluminum, with a brake fluid reservoir formed of plastic aligned therewith for assembly thereto. The master cylinder 10 is mounted to a vacuum power assist booster 13. Master cylinder 10 has a first or forward stepped bore 14 bored on an upper side along a first bore axis 15. Stepped bore 14 has a first small diameter 16 and a first large diameter 18 connected by a passage in the master cylinder to a first chamber 19. The transition from small diameter 16 to large diameter 18 defines a first shoulder 20. A first chamfer 22 is provided for large diameter 18 at an upper surface 23.

Figure 2:
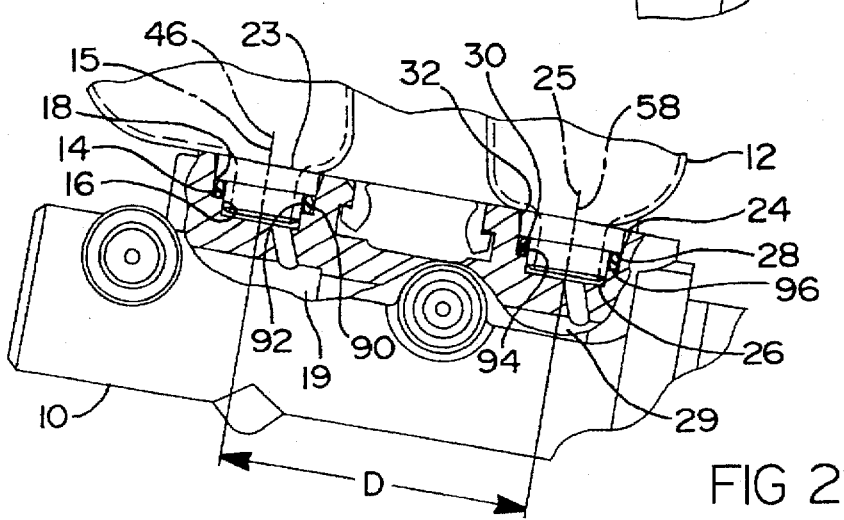
FIG. 2 is a broken out and partially sectioned view of the assembled master cylinder and reservoir.

Second or rear stepped bore 24, best shown in FIG. 2, is centered on second bore axis 25 a predetermined distance D from first bore axis 15. Bore 24 similarly has a second small diameter 26 and a second large diameter 28 with second small diameter 26 connected to a second chamber 29. A transition from second small diameter 26 to second large diameter 28 defines a second shoulder 30. A second chamfer 32 is formed around second large diameter 28 at an upper surface 33.

A snap-in attachment seat 34 is defined in master cylinder 10 by a laterally extending groove 36. A lead-in chamfer 38 tapers inward and downward from upper surfaces 23 and 33. Engagement shoulders 40 are defined on a lower side of seat 34.

Reservoir 12 has a first or forward seating projection 44 located on a first projection axis 46. First seating projection 44 has a large diameter portion 48 proximate to a body 49 of reservoir 12 slightly smaller than first large diameter 18, and a small diameter portion 50 so slightly smaller than first small diameter 16 extending therefrom distal to the reservoir body 49 with a lead chamfer 52 on an end thereof. Large diameter portion 48 defines a first projection shoulder 53 at a base of small diameter portion 50. A first passage 54 passes through first seating projection 44.

A second seating projection 56 extends from body 49 of reservoir 12 and is located on a second projection axis 58 parallel to first projection axis 46 and spaced therefrom by distance D. Second seating projection 56 has a second large diameter portion 60 slightly smaller than second large diameter 28 and a second small diameter portion 62 slightly smaller than second small diameter 26. A second chamfer 64 is located on an end of second small diameter portion 62 distel to the reservoir body. Large diameter portion 60 defines a second projection shoulder 65 at a base of small diameter portion 62. A second passage 66 passes through the second seating projection 56.

A first engagement tang 68, best shown in FIG. 3, extends downward from the reservoir body, a distance B from first projection axis 46, and substantially parallel thereto. Tang 68 has a flat outer side 70 and a radiused back side 72 which decreases in thickness at body 49. A first barbed portion 74 disposed on an end of tang 68 distal to the body 49 defines a first barbed engagement shoulder 76 which engages shoulder 40.

A second engagement tang 78 is spaced distance B from second projection and axis 58 and substantially parallel thereto. Second tang 78 has a second flat outer side 80 and a radiused backside 82 which also decreases in thickness at body 49. A second barbed portion 84 defines a second barbed engagement shoulder 86 in engagement with engagement shoulder 40 which prevents reservoir 12 from being separated from master cylinder 10. The first and second tangs 68 and 78 are approximately equal in width to the length of groove 36.

A first seal 90 is disposed around first small diameter portion 50 in a first seal void 92 defined in part by first shoulder 20 and first projection shoulder 53. A second seal 94 is disposed on second small diameter 62 and within a second seal void 96 defined in part by second shoulder 30 and second projection shoulder 65.

The advantages of the present invention are best understood by understanding how the reservoir 12 is assembled to master cylinder 10. First and second seals 90 and 94 are placed over first and second small diameter portions 50 and 62. Reservoir 12 has its first and second seating projections 44 and 56 approximately aligned with first and second stepped bores 14 and 24. First and second master cylinder chamfers 22 and 32 are contacted by chamfers 52 and 64 of reservoir 12, guiding first and second seating projections 44, 56 into first stepped bore 14 and second stepped bore 24. First and second seals 90 and 94 are compressed in the first and second seal voids 92 and 96 respectively. First engagement tang 68 and second engagement tang 78 deflect inward as they translate down leading chamfer 38 on both sides of laterally extending groove 36, with the deflection being facilitated by the relatively thin tang sections proximate to the reservoir body. Once first and second barbed engagement shoulders 76 and 86 move past engagement shoulder 40, tangs 68 and 78 snap back, producing engagement between the shoulders. First and second seals 90 and 94 are subjected to an axial preload when the engagement shoulders are in engagement. The thickened tang sections provided by the radiused backsides 72 and 82 resists deflection of shoulders 76 and 86 relative to the rest of tangs 68 and 78 to prevent disengagement. When fully seated, first and second small diameter portions 50 and 62 are spaced from a bottom of first and second stepped bores 14 and 24, enabling relatively free flow of fluid through first passage 54 and second passage 66 to first chamber 19 and second chamber 29 respectively.

While a preferred embodiment has been disclosed, it is anticipated variations of the disclosed embodiment will be readily apparent to those skilled in the art. For example, the two relatively wide tangs could be replaced by several narrower tangs. Additionally, engagement shoulders in the master cylinder need not be defined by a laterally extending groove 36, but instead could be defined by an undercut aperture of constant diameter. Further, the snap-in attachment need not be located precisely midway between the bores and projections of the master cylinder and reservoir respectively. It should therefore be appreciated that the true scope of the invention is defined by the following claims.

We claim:

1. A combination of a master cylinder and a fluid reservoir comprising:

a master cylinder having a first bore defining a first reservoir seat, a second bore defining a second reservoir seat spaced a predetermined distance from the first bore and a rigid snap-in attachment seat disposed between the first bore and the second bore;

a reservoir having a first cylindrical seating projection, a second cylindrical seating projection spaced the predetermined distance from the first seating projection, and a snap-in attachment member disposed between the first and second seating projections for alignment and engagement with the snap-in attachment seat; and an elastomeric seal disposed between each of the first bore and the first seating projection and the second bore and the second seating projection wherein the snap-in attachment member is engaged with the attachment seat the seals are both compressed between the reservoir and the master cylinder preventing fluid leakage therepast; wherein the snap-in attachment member includes a pair of tangs each having a shoulder and a radiused backside with a relatively thin section proximate to the reservoir and a relatively thick section proximate to the shoulder, thereby making the tang flexible at the reservoir body and relatively stiff along the rest of its length; and wherein the snap-in seat has a pair of shoulders engaged by the shoulders of the snap-in attachment member.

2. A combination of a master cylinder and a fluid reservoir as claimed in claim 1, wherein the shoulders of the snap-in attachment members are disposed on opposite sides of the tangs for engagement with facing shoulders of the snap-in attachment seat.

3. A method of assembling a reservoir to a master cylinder comprising the steps of:

forming a master cylinder having a first bore defining a first reservoir seat, a second bore defining a second reservoir seat spaced a predetermined distance from the first bore, and a rigid snap-in attachment seat disposed between the first bore and the second bore;

forming a reservoir having a first cylindrical seating projection, a second cylindrical seating projection, spaced the predetermined distance from the first seating projection, and a snap-in attachment member including a pair of tangs each having a shoulder and a radiused backside with a relatively thin section proximate to the reservoir and a relatively thick section proximate to the shoulder, the attachment member being disposed between the first and second seating projections for alignment and engagement with the snap-in attachment seat;

forming a pair of elastomeric seals;

locating one seal on the first and the second seating projections;

aligning the first and second seating projections of any reservoir with a first and second bores of the master cylinder respectively; and moving the reservoir toward the master cylinder until engagement between the snap-in attachment member with the snap-lin attachment seat is achieved.

\* \* \* \* \*